United States Patent [19]
Beers et al.

[11] Patent Number: 5,861,364
[45] Date of Patent: Jan. 19, 1999

[54] CLEANING COMPOSITION

[75] Inventors: Nicolaas Cornelis Maria Beers; Lucas Petrus Simon Keyzer, both of CM Amsterdam, Netherlands

[73] Assignee: Shell Oil Company, Houston, Tex.

[21] Appl. No.: 677,999

[22] Filed: Jul. 10, 1996

[30]     Foreign Application Priority Data

Jul. 11, 1995  [EP]   European Pat. Off. ........... 95201909.9

[51] Int. Cl.⁶ ....................................................... C11D 3/44
[52] U.S. Cl. ......................... 510/174; 510/407; 510/413; 510/505; 510/506
[58] Field of Search ................................. 510/174, 407, 510/413, 505, 506

[56]            References Cited

U.S. PATENT DOCUMENTS 5,145,523   9/1992   Halpin et al. ...................... 106/287.24

FOREIGN PATENT DOCUMENTS 5098292   4/1993   Japan .

*Primary Examiner*—Richard L. Raymond
*Assistant Examiner*—Bruck Kifle
*Attorney, Agent, or Firm*—Dennis V. Carmen

[57]            ABSTRACT

Cleaning composition comprising 65–90% by weight of an aliphatic hydrocarbon solvent, 10–30% by weight of a monohydric aliphatic alcohol containing 8–16 carbon atoms and 0.01–5% by weight of emulsifier, which composition has a flash point of more than 80 C., contains at most 1% by weight of aromatic hydrocarbons and in which composition the weight ratio of amount of component a) to amount of component b) is between 99:1 to 50:50. The cleaning composition is especially suitable for removing ink.

18 Claims, No Drawings

CLEANING COMPOSITION

1. Field of the Invention

The present invention relates to cleaning compositions, more particularly to the use of cleaning compositions in removing ink, more specifically in removing ink from printing machines.

2. Background of the Invention

In the off-set industry it is very important that ink can be removed quickly and thoroughly from the printing surface without harming the metal or rubber components of the apparatus. Further, there is a tendency to require that the cleaning compositions are environmentally friendly in that they contain no or hardly any aromatic compounds, volatile organic compounds and/or halogen containing compounds. A further trend is to require that the compositions fulfill strict safety regulations. In order to fulfill the safety regulations, it is preferred that the compositions have a flash point of more than 80° C., more preferably a flash point of 90° C. or more. This makes them very safe for both transportation and storage.

In Derwent Publications Ltd., London, GB, AN 93-164790, a detergent composition has been described containing (A) 100 parts by weight of a hydrogenated kerosene fraction, (B) 0–40 parts by weight of one or more of a monohydric alcohol, ether, ester, ethoxylated alcohol and aprotic polar solvents, (C) 0.1–20 parts by weight of a, preferably nonionic, surfactant, (D) 0.001–5 parts by weight of an enzyme and (E) water. The composition is described to be effective against fats and oils, greases, rosin type fluxes and proteins.

3. Summary of the Invention

A composition has now been found which gives a good performance in that ink is readily removed while the above requirements are met. The present invention relates to cleaning compositions comprising a) 65–90% by weight, based on total weight of compounds a), b) and c), of an aliphatic hydrocarbon solvent, b) 10–30% by weight, based on total weight of compounds a), b) and c), of a monohydric aliphatic alcohol containing 8–16 carbon atoms, and c) 0.01–5% by weight, based on total weight of compounds a), b) and c), of emulsifier, which composition has a flash point of more than 80° C., contains at most 1% by weight of aromatic hydrocarbons and in which composition the weight ratio of amount of component a) to amount of component b) is between 99:1 to 50:50.

The present invention differs from the composition described in AN 93-164790, in that the composition of the present invention has a flash point of more than 80° C. Furthermore, the composition of the present invention does not harm the metal or rubber components of the printing machine. Esters, ethers and ethoxylated alcohols tend to give a strong rubber swell while aprotic solvents tend to be too aggressive. Further, the present composition is especially suitable for removing ink. During drying, ink will generally polymerize to form a network. The surfactant properties necessary for removing such network are different from the surfactant properties for removing fats and oils, greases, rosin type fluxes and proteins.

4. Detailed Description of the Invention

In view of the safety regulations, the flash point of the composition is to be more than 80° C., preferably 90° C. or more. Most preferably, the flash point is between 100° and 200° C. The flash point is to be measured according to ASTM D 93.

A preferred aliphatic hydrocarbon solvent has a boiling range of 175° to 350° C., and contains at most 0.5% by weight of aromatic hydrocarbons, weight of aromatic compounds on total amount of hydrocarbon compounds of the solvent. More preferably, the aliphatic hydrocarbon solvent contains at most 0.3% by weight of aromatic hydrocarbons and has a boiling range of between 200° to 300° C. Due to the substantial absence of aromatic hydrocarbons, the solvent will primarily consist of paraffins, isoparaffins and naphthenes. In order to further increase the solvency power of the solvent, it is preferred that the solvent comprises at least 34% by weight of naphthenes, more preferably at least 45%. The aromatic content is to be measured with the help of the ultra-violet test method described in SMS 2728 (SMS methods are issued by Shell Internationale Research Maatschappij BV, The Hague, The Netherlands). The boiling point range is to be determined with the help of the test method described in ASTM D86.

An aliphatic solvent which can be used in the present invention is "SHELLSOL D90", having a typical initial boiling point of 220° C., an end boiling point of 275° C., a flash point of 95° C. and containing less than 0.2% by weight of aromatic compounds. Another solvent which can be used and which is most preferred to be used is "SHELLSOL D100", having a typical initial boiling point of 240° C., an end boiling point of 270° C., a flash point of 105° C. and containing less than 0.2% by weight of aromatic compounds. "SHELLSOL" is a Shell trademark.

The flash point requirement makes that low molecular weight alcohols such as ethanol, iso-propanol and tertiary butanol are not suitable for use in the present invention. Further, kerosene fractions are not suitable in view of their relatively high aromatic content.

Preferably, the monohydric alcohol is an alkanol or alkenol of 8 to 16 carbon atoms. A monohydric alcohol with less than 8 carbon atoms is likely to lower the flash point to a too large extent. Further, alcohols containing more than 16 carbon atoms tend to be too viscous for use in the present composition. It was found that poly-alcohols tend to lead to phase separation of the compounds of the composition, which makes them less suitable. A specific monohydric alcohol which can be used in the present invention is a mixture of nonanol, decanol and undecanol, commercially available under the trademark "DOBANOL 91", and/or a mixture of dodecanol and tridecanol, commercially available under the trademark "DOBANOL 23". "DOBANOL" is a Shell trademark. "DOBANOL 91" has a flash point of 107° C. and "DOBANOL 23" has a flash point of 132° C.

In principle, the emulsifier to be used in the present invention can be any commercial package sold for making polar and apolar compounds miscible, while not disturbing the ink solvency power of compounds a) and b) or harming the metal or rubber components of the printing apparatus. It has been found that emulsifiers fulfilling these requirements can comprise a polyoxyethylene glycol ester of a carboxylic acid which carboxylic acid contains between 15 and 25 carbon atoms and/or an alkanol amide. A preferred polyoxyethylene glycol ester comprises between 2 and 5 oxyethylene units and as carboxylic acid an unsaturated acid containing between 15 and 20 carbon atoms, e.g. oleic acid. The alkanol amide preferably is a dialkanol amide of which the alkanol units comprise between 1 and 6 carbon atoms, and the acyl moiety comprises between 2 and 30 carbon atoms, preferably between 5 and 25 carbon atoms. A preferred alkanol amide is diethanol amide of which the acyl moiety comprises between 5 and 25 carbon atoms. A commercially available emulsifier which is suitable for use in the present invention is "MARLOWET MA" (MARLOWET MA is a trademark) which can be obtained from Huels.

The ratio of amount of compound a) to amount of compound b) influences the ink removal properties of the composition. It has been found that good results are obtained if compound a) is present in an amount of 65–90% by weight, while compound b) is present in an amount of 10–30% by weight. More preferably, the ratio of compound a) to compound b) is between 95:5 and 60:40, more preferably between 90:10 and 65:35. Especially good results have been obtained with a composition containing the compounds in a ratio of between 78:22 and 82:18.

In a preferred embodiment, the cleaning composition according to the present invention is made of:

a) 65–90% by weight, based on total amount of compounds a), b) and c), of an aliphatic hydrocarbon solvent, b) 10–30% by weight, based on total amount of compounds a), b) and c), of a monohydric aliphatic alcohol containing 8–16 carbon atoms, c) 0.01–5% by weight, based on total amount of compounds a), b) and c), of emulsifier, and d) optionally water, which composition has a flash point of more than 80° C., contains at most 1% by weight of aromatic hydrocarbons and in which composition the weight ratio of amount of component a) to amount of component b) is between 99:1 to 50:50.

Water can be absent or present in the composition. If present, the amount of water can vary between wide ranges. The amount of water which can be present can be 0–300% by weight, based on total amount of compounds a), b) and c), preferably 0–200% by weight.

The composition of the present invention can be used for removing ink from printing machines, more specifically from off-set printing machines. The use of the composition comprises treating the printing surface with the cleaning composition, e.g. by brushing or wiping the surface with a cloth treated with the composition, and subsequently rinsing the treated surface with a liquid to remove the remaining composition. Usually, the surface will be rinsed with water. Rinsing with a liquid after treating the surface with the composition, is necessary in view of the high flash point which can only be attained with liquids of limited volatility. A mixture of cleaning composition and water is obtained. If this mixture is left standing still for between 0.5 and 3 hours, the liquids separate and the separated cleaning composition can be used again after distillation and subsequent addition of a suitable amount of emulsifier. The relatively mildly contaminated water fraction which remains, is to be treated further.

The invention is illustrated by the following examples.

EXAMPLE 1

The inks used in the examples are an offset rotation ink from Premier Holland (22.200).

In offset printers nitrylbutadiene rubber (NBR) is commonly used as material for the blanket sheet on the printing cylinders and the cover of the inkrollers. Accordingly, the influence of the cleaner composition (rubber swell) was tested on the following NBR types:

NBR, No. 17925, blankets offset; Shore A hardness 25, Böttcher

NBR, No. 39935, rotation offset; Shore A hardness 35, Böttcher

NBR, ink roll obtained from the firm Heidelberg

The method for the determination of rubber swell is based on the measurement of the solvent uptake or "absorption" in a rubber specimen after a fixed immersion time. The volume change is obtained by weighing the specimen in air and water before and after immersion. The method is described in detail below.

Rubber Swell (adapted ASTM 471-79)

A rubber test specimen of 1×1.5 cm$^2$ (approx. 1.0 g) was immersed in alcohol and dried with filter paper to remove dirt. Next, the specimen was weighed at room temperature in air (M1) and in distilled water (M2). Then, the specimen was quickly immersed in alcohol, dried with compressed air and placed in a 30 ml weighing bottle with 25 ml test medium. This bottle was placed in a conditioned room (23° C., 50% relative humidity). After 25 hours immersion, the specimen was removed from the solvent, quickly immersed in alcohol, dried with compressed air, placed in a tared stoppered weighing bottle and weighed (M3). After weighing in air, the specimen was removed from the bottle and weighed in distilled water at room temperature (M4) to determine the water displacement after immersion. The procedure from removal of the specimen from the test medium to stoppering the weighing bottle and from removal from the weighing bottle to immersion in water was taken no more than 30 seconds. Any air bubbles clinging to the test specimen were removed before weighing in distilled water.

Formulas for Determining Rubber Swell

Change in volume (%)=((M3−M4)−(M1−M2))/(M1−M2)×100

Change in mass (%)=(M3−M1)/M1×100

Cleaning Performance

The testing of the cleaning performance of solvents and solvent blends is based on the dissolution of a film of dried ink. This film was dried for fixed time intervals. The method applied is semi-static, i.e., the amount of external energy applied into the solubility/cleaning process is as low as possible. The cleaning efficiency is rated as follows:

1: no effect cleaning composition

2: soft film of ink

3: very soft film of ink

4: very soft film of ink and minor part of film of ink removed

5: very soft film of ink and large part of film of ink removed

6–9: film of ink totally removed, ranking on residual blue color.

Ink Cleaner Test

First a strip of aluminum foil (10×50 cm$^2$) was thoroughly cleaned with successively xylene and 2-butanone and dried. Next, a film of ink was applied with a 100 micron applicator resulting in a dry film with a thickness of about 50 microns. After a fixed drying time (2/6 hours, 1/3/7 days) at 23 C. and 50% relative humidity, a small strip (approximately 0.75×2 cm$^2$) of coated aluminum foil was cut from the center of the film and put in a 7 ml vial containing approximately 3 ml of cleaner composition. After 1 day rollerbank, the aluminum foil was removed from the solvent and carefully dried by dabbing with a tissue. The cleaning efficiency of the cleaner composition was obtained by evaluation of the appearance of the treated aluminum foil. The appearance of the solvent was evaluated after 1 day of sedimentation.

Results

A range of cleaner compositions have been tested, the results of which have been summarized in the table.

Comparative Example 1 relates to "SHEET CLEANER" ("SHEET CLEANER" is a trademark), which is a product from Smeets. The product is based on aromatic hydrocarbon solvents and volatile alcohols.

Comparative Example 2 relates to a composition containing 77% by weight of "SHELLSOL D60", an aliphatic hydrocarbon solvent having a boiling range between 187° and 211° C. and a flash point, measured according to ASTM D93, of 66° C., 9% by weight of 2-methyl-2,4-pentanediol and 14% of a mixture of 2,6-dimethyl-4-heptanol and 4,6-dimethyl-2-heptanol.

Example 3 relates to a composition containing 79.5.% by weight of "SHELLSOL D100", an aliphatic hydrocarbon solvent having a boiling range between 240° and 270° C. and a flash point, measured according to ASTM D93, of 105° C., 20% by weight of "DOBANOL 91", containing primary alcohols containing between 9 and 11 carbon atoms, and 0.5% by weight of "MARLOWET MA", containing a mixture of a polyoxyethylene glycol ester based on oleic acid and comprising between 2 and 5 oxyethylene units and a diethanol amide of a fatty acid. The composition has a flash point, measured according to ASTM D93, of 105° C.

Comparative Example 4 relates to a composition consisting of "SHELLSOL D100" was used.

The results are summarized in the following Table 1.

TABLE 1

Examples 1–4

| Example | 1 (comp.) | 2 (comp.) | 3 | 4 (comp.) |
|---|---|---|---|---|
| Flash point (°C.) | 12[a] | 63 | 105 | 105 |
| Cleaning efficiency after x hours/days drying of the film of Premier offset printing ink | | | | |
| Rating of cleaning efficiency | | | | |
| 2 hours | 7 | 9 | 9 | 4 |
| 6 hours | 7 | 9 | 9 | 4 |
| 1 day | 8 | 8 | 9 | 3 |
| 3 days | 8 | 8 | 7 | 3 |
| 7 days | 5 | 6 | 6 | 3 |
| rubber swell % volume | | | | |
| NBR 17925 | 33 | 7 | 0.8 | *) |
| NBR 39935 | 28 | 5 | 0.5 | *) |
| NBR Ink Rol | 31 | 7 | 0 | *) |

[a]This flash point has been calculated.
*) Not measured.

It will be clear from the above results that the composition of the present invention is highly efficient at removing ink, while having a high flash point which makes it suitable for safe storage and transport.

EXAMPLE 2

Compositions were tested containing differing amounts of "SHELLSOL D100" and "DOBANOL 91" and further containing 0.5% by weight of "MARLOWET MA". These compositions were tested as described in Example 1. Drying was carried out for 1 day. The weight ratios and cleaning efficiencies obtained, are shown in Table 2.

TABLE 2

Example 5

| "SHELLSOL D100":"DOBANOL 91" | cleaning efficiency |
|---|---|
| 100:0 | 2 |
| 90:10 | 5[b] |

TABLE 2-continued

Example 5

| "SHELLSOL D100":"DOBANOL 91" | cleaning efficiency |
|---|---|
| 80:20 | 9 |
| 70:30 | 9 |
| 60:40 | 9 |
| 50:50 | 9[c] |
| 25:75 | 5 |
| 0:100 | 3 |

[b]although initially there was a high cleaning efficiency, there also was redeposition.
[c]slow

We claim:

1. A cleaning composition comprising:
   a) 65–90% by weight of an aliphatic hydrocarbon solvent,
   b) 10–30% by weight of a monohydric aliphatic alcohol containing 8–16 carbon atoms, and
   c) 0.01–5% by weight of emulsifier,
each based on total weight of compounds a), b) and c), and which composition has a flash point of more than 80° C., contains at most 1% by weight of aromatic hydrocarbons, and wherein said aliphatic hydrocarbon solvent comprises at least 34 percent by weight of naphthenes based on the weight of the aliphatic hydrocarbon solvent.

2. Composition according to claim 1, wherein the aliphatic hydrocarbon solvent of the composition has a boiling range of between 200° and 300° C. and contains at most 0.3% by weight of aromatic hydrocarbons.

3. Composition according to claim 1 or 2, which composition has a flash point of 100° C. or more.

4. Composition according to claim 1, which composition comprises as emulsifier a polyoxyethylene glycol ester of a carboxylic acid which carboxylic acid contains between 15 and 25 carbon atoms and/or an alkanol amide.

5. Composition according to claim 1, in which composition the weight ratio of amount of component a) to amount of component b) is between 78:22 and 82:18.

6. Composition of claim 1, which composition consists of:
   a) 65–90% by weight of an aliphatic hydrocarbon solvent,
   b) 10–30% by weight of a monohydric aliphatic alcohol containing 8–16 carbon atoms, and
   c) 0.01–5% by weight of emulsifier,
each based on total weight of compounds a), b) and c), and which composition has a flash point of more than 80° C., contains at most 1% by weight of aromatic hydrocarbons.

7. A process of removing ink from a printing machine comprising applying to the printing machine a composition comprising:
   a) 65–90% by weight of an aliphatic hydrocarbon solvent,
   b) 10–30% by weight of a monohydric aliphatic alcohol containing 8–16 carbon atoms, and
   c) 0.01–5% by weight of emulsifier,
each based on total weight of compounds a), b) and c), and which composition has a flash point of more than 80° C., contains at most 1% by weight of aromatic hydrocarbons, and wherein the aliphatic hydrocarbon solvent comprises at least 34 percent by weight of naphthenes based on the weight of the aliphatic hydrocarbon solvent, and removing the composition from the printing machine.

8. The process of claim 7, wherein the ink is removed from the printing machine by rinsing the treated surface with liquid.

9. The cleaning composition of claim 1, wherein the amount of said naphthene is at least 45 weight percent.

10. The cleaning composition of claim 1, wherein said cleaning composition is free of ethanol, isopropanol, and tertiary butanol.

11. The cleaning composition of claim 1, further comprising water.

12. The cleaning composition of claim 1, wherein said cleaning composition is free of ethers, ethoxylated alcohols, and aprotic solvents.

13. The process of claim 7, wherein the aliphatic hydrocarbon solvents of the composition has a boiling range of between 200° and 300° C. and contains at most 0.3% by weight of aromatic hydrocarbons.

14. The process of claim 7, wherein said composition has a flash point of 90° C. or more.

15. The process of claim 14, wherein said composition has a flash point of 100° C. to 200° C.

16. The process of claim 7, wherein the emulsifier comprises a polyoxyethylene glycol ester of a carboxylic acid which carboxylic acid contains between 15 and 25 carbon atoms and/or an alkanol amide.

17. The process of claim 7, wherein the weight ratio of component a) to component b) is between 78:22 and 82:18.

18. The process of claim 7, wherein said composition is free of ethoxylated alcohols, aprotic solvents, ethanol, isopropanol, and tertiary butanol.

* * * * *